(12) United States Patent
Liu et al.

(10) Patent No.: US 9,194,594 B2
(45) Date of Patent: Nov. 24, 2015

(54) MULTIPLE TANKS WATER THERMAL STORAGE SYSTEM AND ITS USING METHOD

(75) Inventors: Hong Liu, Beijing (CN); Yuanquan Jiang, Beijing (CN); Zhangwei Hou, Beijing (CN)

(73) Assignee: Beijing Poweru Technology Co., Ltd., Beijing (CN)

( * ) Notice: Subject to any disclaimer, the term of this patent is extended or adjusted under 35 U.S.C. 154(b) by 964 days.

(21) Appl. No.: 12/519,409

(22) PCT Filed: Dec. 28, 2007

(86) PCT No.: PCT/CN2007/003875
§ 371 (c)(1),
(2), (4) Date: Jun. 16, 2009

(87) PCT Pub. No.: WO2008/086711
PCT Pub. Date: Jul. 24, 2008

(65) Prior Publication Data
US 2010/0025031 A1    Feb. 4, 2010

(30) Foreign Application Priority Data
Dec. 31, 2006   (CN) .......................... 2006 1 0171597

(51) Int. Cl.
G05D 23/00       (2006.01)
F24F 5/00        (2006.01)
F28D 20/00       (2006.01)

(52) U.S. Cl.
CPC .......... *F24F 5/0017* (2013.01); *F28D 20/0034* (2013.01); *F28D 20/0039* (2013.01); *Y02E 60/142* (2013.01); *Y02E 60/147* (2013.01)

(58) Field of Classification Search
CPC ........ F24F 5/0017; F24D 17/001; F24H 1/18; F28D 20/0034; F28D 20/0039; F28D 20/0043; F28D 2020/0082; F28F 27/00; G05D 23/00
USPC ......... 165/287, 288, 45, 104.19, 104.28, 132; 60/641.1; 405/56; 62/260; 137/255, 137/265, 266, 391
See application file for complete search history.

(56) References Cited

U.S. PATENT DOCUMENTS 3,653,262 A * 4/1972 Ehrenfried et al. ........... 374/142
3,688,839 A * 9/1972 Kirschner et al. ............ 165/108
(Continued)

FOREIGN PATENT DOCUMENTS

CN    2752650 Y    1/2006
CN    2816655 Y    9/2006
(Continued)

*Primary Examiner* — Travis Ruby
(74) *Attorney, Agent, or Firm* — Calfee, Halter & Griswold LLP

(57) ABSTRACT

A multiple-tank water thermal storage system and its using method belong to energy saving technology. The multiple-tank water thermal storage system includes at least two water tanks. There are an upper diffuser (2) and a lower diffuser (5) provided in each said water tank. The upper and lower diffusers (2, 5) are connected with a chiller (heater) unit (4) and a heat exchanger (11) after connecting in parallel, respectively. Control valves (8) are set on pipes of the upper and the lower diffusers (2, 5), respectively. A thermal energy-charging pump (1) is set on the water-inlet pipe of chiller (heater) unit (4). A thermal energy-releasing pump (10) is set on the water-inlet pipe of the heat exchanger (11), and temperature sensors (6) are set in the water tanks.

21 Claims, 1 Drawing Sheet

(56) References Cited

U.S. PATENT DOCUMENTS

| | | | |
|---|---|---|---|
| 4,012,920 A * | 3/1977 | Kirschbaum | 62/235.1 |
| 4,044,949 A * | 8/1977 | Morawetz et al. | 126/586 |
| 4,143,705 A * | 3/1979 | Awalt, Jr. | 165/48.2 |
| 4,313,419 A * | 2/1982 | Lyon et al. | 126/585 |
| 4,403,602 A * | 9/1983 | Warden | 126/610 |
| 5,067,170 A * | 11/1991 | Nagashima et al. | 392/461 |
| 5,381,860 A * | 1/1995 | Mather | 165/104.19 |
| 6,408,896 B1 * | 6/2002 | Watanabe et al. | 141/59 |
| 2004/0065148 A1 * | 4/2004 | Ham | 73/295 |

FOREIGN PATENT DOCUMENTS

| | | |
|---|---|---|
| JP | 6249473 A | 9/1994 |
| JP | 2005315524 A | 11/2005 |

\* cited by examiner

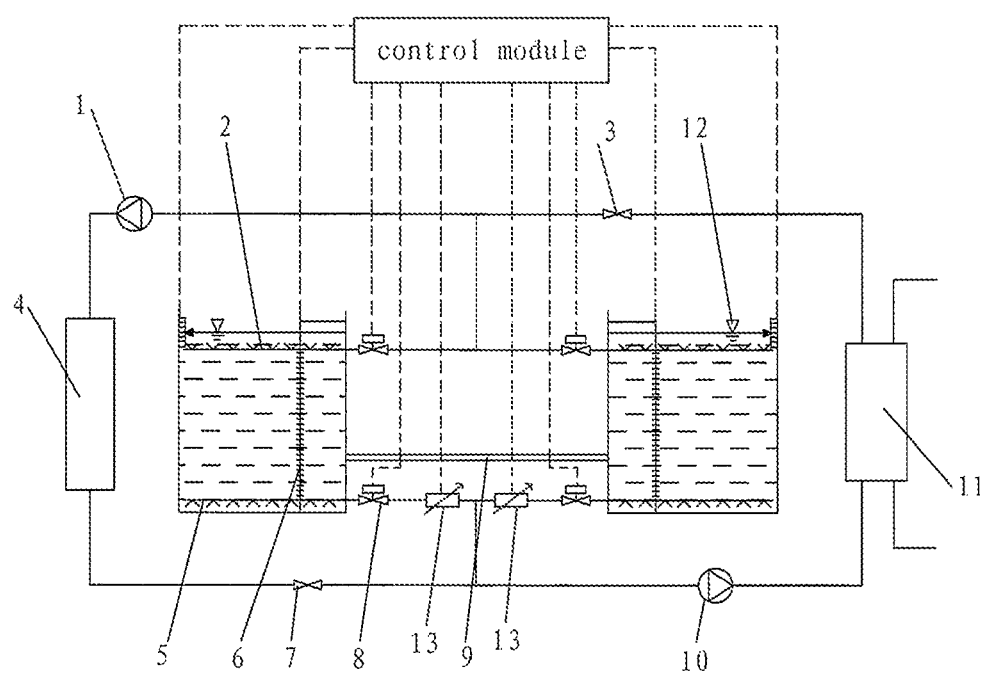

MULTIPLE TANKS WATER THERMAL STORAGE SYSTEM AND ITS USING METHOD

FIELD OF THE INVENTION

The present invention relates to an energy conservation system using water thermal storage technology, especially to a multiple-tank water thermal storage system. The present invention also relates to the utilization method of such a system.

BACKGROUND OF THE INVENTION

With constant improvement in living standards, it has become increasingly common to utilize air conditioning technology to provide cooling sources in summer and heating sources in winter. Normally, the electricity use on air conditioning is light at night but heavy during the day, which competes with other usage of electricity at peak hours while capitulating at trough hours. This is a major factor causing the peak-trough differential usage in the electricity network. To ensure safety and reasonable and efficient operation of the electricity network, electricity is set at different prices for peak and trough hours to encourage the shifting of electricity usage from peak to trough hours.

Thermal (heat or cool) storage is a technique to adjust electricity usage under the peak-trough differential pricing regime. It stores "heat" or "cool" produced during night when the electricity price is relatively low, and then releases such stored thermal energy at a time when electricity is more expensive, thus achieving the double benefit of leveling the peak to fill the trough in electricity usage and cost-saving for electricity users.

Thermal charging and releasing is the core of this technology. Water thermal storage technology uses water as a thermal storage medium to store thermal energy utilizing the absorption and releasing of sensible heat during changes of the water temperature.

The natural stratification water thermal storage technology makes natural stratification of hot and cold water in the same tank with a very simple structure and without artificial separation devices, by utilizing the principle that water of higher temperatures floats upward with a lower density whereas water of lower temperatures tanks with a higher density. The core of water thermal storage technology is to prohibit or inhibit the mixing and heat exchange of stored water of different temperatures. Since the coefficient of thermal conductivity of water is relatively small, as long as stratification is stable, heat exchange will be kept relatively small. The key to maintain the stability of stratification is to ensure that the diffusers of hot and cold water ports can control water flows slowly and evenly into water thermal storage tanks in the form of a density flow. Apparently, the bigger water flow is, the stronger is water distribution intensity (flow volume per area of water distribution) the easier is to disturb water in tanks and mix hot and cold water together, resulting in lower thermal storage efficiency.

In order to enhance the thermal storage capability of an air conditioning system, it is generally desirable to have a tank with a sufficient volume capacity. However, in practice, when it is impossible to construct a tank with a sufficient volume capacity due to certain constrains, a system with multiple tanks is instead utilized. There are two solutions for this in the prior art:

1. Each tank stores thermal energy individually. For example, when storing "cool" (cold water), the first tank is charged with cool, and then the second tank, and go on in this order; the same way applies when releasing cool. There are two disadvantages with this method: 1) when switching tanks, it requires frequent operations which may easily cause mistakes; 2) for each single tank, the power of heat or cool sources is relatively high, and flow is relatively big if the system is fully loaded, resulting in undesirable efficacy in water diffusion and efficiency in thermal storage; however, if lowering the power of operation, electrical efficiency of cool (hot) source will also be compromised.

2. Tanks are connected in series: e.g. the hot port of the first tank is connected to the cold port of the second tank, the hot port of the second tank is connected to the cold port of the third tank, and so on and so forth in this order. When charging cool, cold water flows into the first tank via its cold port, warm water flows out of the last tank via its hot port, and the cool charging process is completed when cold water fills all the tanks. In this way, there are three disadvantages: 1) the flow may be relatively high to each tank in series, causing an undesirable efficacy in water diffusion. 2) the flow goes through the water diffusers of each tank several times, which increases the possibility of mixing hot and cold water and reduces significantly the efficiency of thermal storage; 3) if each serial-connected tank is a open system, the flow between the tanks must be driven by the water level differential, e.g. the water level of the upper tank must be higher than that of the lower tank. The flow directions in the processes of charging cool (heat) and releasing cool (heat), however, are completely different, requiring opposite water gradients of tanks, which results in water levels of tanks at each end having quite big difference in such two processes, as well as additional difficulty in the design of water diffusers and construction, and waste of storage space; if each serial-connected tank is a closed system, each tank must be pressurized, thus increasing the cost.

In the prior art, there is no report that tanks are connected in parallel to store thermal energy simultaneously or synchronously, because:

1. Each tank is an open, non-pressurized container with its free surface in contact with air. The thermal storage system with many parallel-connected tanks is thus a complex open fluid system with many free surfaces in contact with air. In the process of charging or releasing thermal energy, due to various pressure drops produced by the flow passing water diffusers of each tank, the height of the free surface in each tank will significantly change. If the water level is too high, the fluid will overflow. If the water level is too low, the upper diffuser will be exposed to air, causing pump suction problem. To ensure proper function, the water level of each tank must avoid intensive fluctuation during the synchronous operation of parallel-connected tanks.

2. During the synchronous operation of parallel-connected tanks, if tanks cannot complete thermal energy charging and releasing strictly synchronously, the volume utilization rate of tanks will be compromised. Taking cool storage as an example, if charging cool, the cold water out of the hot port of the tank that is the first to complete cool charging will cause alert at the chiller and shuts it down due the temperature of input water being too low. This will disrupts cool charging process for other tanks which fall behind, resulting in waste of volume of charging cool; if releasing cool, the hot water out of the cold port of the tank that is the first to complete cool releasing will cause the temperature in the cool supply tube to dramatically increase and the cool releasing is forced to stop, and then the tank, the process of which falling behind, cannot complete the process of releasing cool, which results in the waste of stored cool. In order to maintain the water temperature in the outputs and improve the efficiency of thermal storage, the tanks must be charged with or release thermal energy synchronously in the process of thermal energy charging and releasing.

The above mentioned problems have not been solved by prior art, thus the method of synchronous thermal energy charging and releasing by parallel-connected tanks still cannot be applied in practice.

SUMMARY OF THE INVENTION

The objective of present invention is to provide a multiple-tank water thermal storage system, characterized in high efficiency and low cost of operation, convenient controlling and high capability of thermal storage, as well as its utilization method.

The present invention provides a technical solution to solve the foregoing technical issues:

a multiple-tank water thermal storage system, comprising at least two tanks, upper diffusers and lower diffusers provided in each said tank respectively, control valves set on pipes of said upper and lower diffusers respectively and said tanks connected in parallel for simultaneous use.

Preferably, said tanks comprise level sensors.

Preferably, each said tank comprises a plurality of temperature sensors and said temperature sensors are distributed at different levels.

Preferably, said temperature sensors are set vertically with even distance.

Preferably, there is a flow meter set on the water-inlet pipe of either the upper diffuser or the lower diffuser in each said tank.

Preferably, there is a connecting tube between said tanks.

Preferably, said system comprises a control module, signally connected with said level sensors, temperature sensors and flow meters, and controlling said control valves.

Present invention also provides a using method of the multiple-tank water thermal storage system; when charging thermal energy, water out of a chiller (heater) unit is pumped into tanks through inlet diffusers by an thermal energy-charging pump and at the same time replacing water flows to the chiller(heater) unit from outlet diffusers; when releasing thermal energy, inlet tanks is pumped into a heat exchanger through outlet diffusers by an thermal energy-releasing pump and at the same time replacing water flows into tanks through inlet diffusers from the heat exchanger; said tanks are connected in parallel and at least two of the tanks are charged with or release thermal energy simultaneously or synchronously.

When said parallel-connected tanks are charged with or release thermal energy simultaneously or synchronously, if water levels of the tanks show differences, the flow exchanging via connecting tubes between tanks can reduce the water level differential between tanks.

The water level differential can be eliminated, if water levels of tanks show big difference, by the following method: turning up the control valve on the pipe of the inlet diffuser and turning down the control valve on the pipe of the outlet diffuser in the tank with a lower water level; alternatively, turning down the control valve on the pipe of the inlet diffuser and turning up the control valve on the pipe of the outlet diffuser in the tank with a higher water level.

Water levels of said tanks can be measured by level sensors.

When parallel-connected tanks are charged with or release thermal energy synchronously, said system can reach the best thermal storage state. The synchronization of said tanks can be achieved by setting flow meters on pipes of diffusers in said tanks and adjusting control valves on pipes of diffusers in said tanks in such a way that the ratio in flow rates of the tanks equals to that in volume. Synchronous thermal energy charging and releasing of tanks can be therefore made possible.

The water temperatures in a tank can be measured by temperature sensors, with which real time stored thermal energy of tanks can be calculated. The percentage of real time stored thermal energy to the maximum thermal storage of a tank (thermal storage percentage) indicates the progress of thermal energy charging or releasing of said tank. When parallel-connected tanks are used synchronously, if thermal storage percentages of tanks show differences, it means that progresses of thermal energy charging or releasing are not synchronous: when charging thermal energy, higher thermal storage percentage indicates the progress of thermal energy charging surpasses others; when releasing thermal energy, higher thermal storage percentage indicates the progress of thermal energy releasing falls behind. If the difference in thermal storage percentage between tanks exceeds a threshold, it can be corrected by turning up control valves of inlet and outlet diffusers of the tank wherein said progress falls behind or turning down control valves of inlet and outlet diffusers of the tank wherein said progress surpasses others.

The advantage of the present invention is that thermal storage of natural stratification tanks in parallel can be achieved; comparing with thermal storage of tanks individually or in serial connection, with the same system requirements, the flow of parallel-connected tanks is several percent of that of serial-connected tanks or of an individual tank, and the efficacy of diffusion and efficiency of thermal storage of parallel-connected tanks are also significantly improved; only once diffusion is required in operation, thus significantly reducing the likelihood of disrupted stratification; the position of each tank is not strictly limited and highly flexible. The flow into and out of each tank can be controlled via control valves, therefore balances of water level and thermal storage of tanks may be adjusted, and the objective of synchronous thermal energy charging or releasing can be finally achieved.

BRIEF DESCRIPTION OF THE DRAWINGS

The present invention will be further described with the accompanying drawing and the detailed description of certain embodiments.

FIG. 1 is a schematic diagram of one embodiment when chilled water storing of present invention, wherein: cool charging pump 1, upper diffuser 2, cool releasing block valve 3, chiller unit 4, lower diffuser 5, temperature sensor 6, cool charging block valve 7, control valve 8, connecting tube 9, cool releasing pump 10, heat exchanger 11, level sensor 12.

DETAILED DESCRIPTION OF EMBODIMENTS

As shown in FIG. 1, a chilled water storage air conditioning system consists of two tanks, each comprising a upper diffuser 2, a lower diffuser 5, a level sensor 12 and temperature sensors 6, wherein a certain amount of temperature sensors 6 are set vertically and evenly along the stratification of water in the tank. Upper diffusers 2 of said two tanks are connected in parallel and then the path is separated into two paths, one connecting to the chiller unit 4, and the other connecting to the heat exchanger 11; lower diffusers 5 of said two tanks are connected in parallel and then the path is separated into two paths, one connecting to the chiller unit 4, and the other connecting to the heat exchanger 11; the cool charging pump 1 and the cool charging block valve 7 are set separately on water-inlet and water-outlet pipes of the chiller unit 4; the cool releasing pump 10 and the cool releasing block valve 3 are set separately on water-inlet and water-outlet pipes of the heat exchanger 11; control valves 8 are set separately on pipes of upper and lower diffusers 2, 5 of said two tanks; there is a connecting tube 9 between said two tanks.

The operation process of above described system is:

When charging cool, the cool releasing pump 10 and the cool releasing block valve 3 are closed, while the cool charging pump 1 and the cool charging block valve 7 are open, cold water obtained via the refrigeration of the chiller unit 4 flowing into the tank through its lower diffuser 5; meanwhile, warm water flows out of the tank through its upper diffuser 2 and obtains cool in the chiller unit 4; in this case, lower diffusers 5 are water-inlet ones, and upper diffusers 2 are water-outlet ones. In the process of cool charging, when water levels of the two tanks show difference, usually, if the difference is relatively small, the connecting tube 9 between said two tanks may balance water levels thereof; if the difference is relatively big, the following steps may be taken to balance water levels thereof: turning up the control valve 8 on the pipe of the water-inlet diffuser (e.g., the lower diffuser 5) and turning down the control valve 8 on the pipe of the water-outlet diffuser (e.g., the upper diffuser 2) in the tank with a lower water level; alternatively, turning down the control valve 8 on the pipe of the water-inlet diffuser (e.g., the lower diffuser 5) and turning up the control valve 8 on the pipe of the water-outlet diffuser (e.g., the upper diffuser 2) in the tank with a higher water level. Apparently, two above mentioned solutions may be taken together. In the process of cool charging, water temperatures at different levels in the tank can be measured by temperature sensors 6, such as to calculate stored cool of the tank and then the percentage of the stored cool to the maximum cool storage (cool storage percentage) to measure progresses of cool charging of said tanks. If the cool storage percentage of one tank is lower than that of the other, it means that its progress of cool charging falls behind. In this case, the cool charging synchronization of the two tanks can be recovered by turning up control valves 8 of water-inlet diffuser (e.g., the lower diffuser 5) and water-outlet diffuser (e.g., the upper diffuser 2) of said tank; or turning down control valves 8 of water-inlet diffuser (e.g., the lower diffuser 5) and water-outlet diffuser (e.g., the upper diffuser 2) of the other tank. Apparently, both solutions may be taken together.

When cool storage percentages of the two tanks reach nearly 100% and the temperature of water out of the upper diffusers is lower than a predetermined value, the process of cool charging is completed, then turning off the chiller unit 4, the cool charging pump 1 and the cool charging block valve 7 sequentially.

When releasing cool, the cool releasing pump 10 and the cool releasing block valve 3 are open, while the cool charging pump 1 and the cool charging block valve 7 are closed, water is pumped out of the tank by the cool releasing pump 10, then exchanging heat in the heat exchanger 11 and flowing back into the tank. In this case, upper diffusers 2 are water-inlet ones, and lower diffusers 5 are water-outlet ones. In the process of cool releasing, when water levels of the two tanks show difference, usually, if the difference is relatively small, the connecting tube 9 between said two tanks may balance water levels thereof; if the difference is relatively big, the following steps may be taken to balance water levels thereof: turning up the control valve 8 on the pipe of the water-inlet diffuser (e.g., the upper diffuser 2) and turning down the control valve 8 on the pipe of the water-out diffuser (e.g., the lower diffuser 5) in the tank with a lower water level; alternatively, turning down the control valve 8 on the pipe of the water-inlet diffuser (e.g., the upper diffuser 2) and turning up the control valve 8 on the pipe of the water-outlet diffuser (e.g., the lower diffuser 5) in the tank with a higher water level. Apparently, two above mentioned solutions may be taken together. In the process of cool releasing, water temperatures at different levels in the tank can be measured by temperature sensors 6, such as to calculate the remaining cool of the tank and then the percentage of the remaining cool to the maximum cool storage (cool storage percentage) to measure progresses of cool releasing of said tanks. If the cool storage percentage of one tank is higher than that of the other, it means that its progress of cool releasing falls behind. In this case, the cool releasing synchronization of the two tanks can be recovered by turning up control valves 8 of water-inlet diffuser (e.g., the upper diffuser 2) and water-outlet diffuser (e.g., the lower diffuser 5) of said tank; or turning down control valves 8 of water-inlet diffuser (e.g., the upper diffuser 2) and water-outlet diffuser (e.g., the lower diffuser 5) of the other tank. Apparently, both solutions may be taken together.

When cool storage percentages of the two tanks reach nearly zero and the temperature of water out of the lower diffusers 5 is higher than a predetermined value (usually the upper limit of operation temperature of the heat exchanger), the process of cool releasing is completed, then turning off the cool releasing pump 10 and the cool releasing block valve 3 sequentially.

In order to achieve automatic control, temperature sensors 6, level sensors 12, control valves 8 and the like may be connected with a computer, and the above described process can be controlled by the computer instead of inconvenient manual control.

It is within the knowledge of one of ordinarily skilled in the art that when turning up/down above mentioned control valves to make adjustments, control valves may be adjusted by close cycle control according to feedback parameters. Various self-adapting algorithms in prior art can be used, such as PID controller etc.

The heat storage process of the water thermal storage system of present invention has similar principles as the cool storage process thereof. When charging heat, upper diffusers 2 are water-inlet ones, lower diffusers 5 are water-outlet ones; when releasing heat, lower diffusers 5 are water-inlet ones, and upper diffusers 2 are water-outlet ones; water temperatures at different levels in the tank can be measured by temperature sensors 6, such as to calculate the heat storage percentage of each tank (the percentage of the stored heat to the maximum heat storage of the tank) to control the operation of the system and ensure the synchronization of heat charging or releasing of said tanks.

What is claimed is:

1. A multiple-tank water thermal storage system, comprising:
at least two non-pressurized water tanks that are open to the atmosphere, each tank having an upper diffuser and a lower diffuser, each diffuser comprising a plurality of openings disposed within the tank and being configured to diffuse the water entering and exiting the tank through the diffuser to facilitate thermal stratification of the water in the tank, wherein said upper diffuser and said lower diffuser each include a water-inlet pipe and each water-inlet pipe comprises an adjustable control valve to control the flow of water through the diffuser, and wherein the water-inlet pipe of at least one of the upper diffuser and the lower diffuser of each tank comprises a flow meter, and wherein said tanks are fluidly connected in parallel with a water chiller and a heat exchanger, and wherein the upper and lower diffusers of each tank are fluidly connected to the water chiller and the heat exchanger;

a first pump in fluid communication with and positioned between the upper diffuser and the water chiller, the first pump configured to pump water from said tanks through the upper diffusers, through the water chiller, and back to said tanks through the lower diffusers;

a first block valve in fluid communication with and positioned between the water chiller and the lower diffusers;

a second pump in fluid communication with and positioned between the lower diffusers and the heat exchanger, the second pump configured to pump water from said tanks through the lower diffusers, through the heat exchanger, and back to said tanks through the upper diffusers; and a second block valve in fluid communication with and positioned between the heat exchanger and the upper diffusers;

wherein, when the system is in a first condition, the adjustable control valves are open and adjusted such that the first pump pumps water from both tanks simultaneously through the upper diffusers, through the water chiller, and back to said tanks through the lower diffusers, the second pump is off, and the second block valve is closed; and wherein, when the system is in a second condition, the adjustable control valves are open and adjusted such that the second pump pumps water from both tanks simultaneously through the lower diffusers, through the heat exchanger, and back to said tanks through the upper diffusers, the first pump is off, and the first block valve is closed.

2. The multiple-tank water thermal storage system of claim 1 wherein each tank comprises a level sensor.

3. The multiple-tank water thermal storage system of claim 1 wherein each tank comprises a plurality of temperature sensors, and said temperature sensors are set at different levels.

4. The multiple-tank water thermal storage system of claim 3 wherein said temperature sensors are set evenly along a vertical direction.

5. The multiple-tank water thermal storage system of claim 1 wherein there is a connecting tube between said tanks.

6. The multiple-tank water thermal storage system of claim 1 wherein said system comprises a control module which can adjust said adjustable control valves.

7. The multiple-tank water thermal storage system of claim 1, wherein each diffuser is configured to reduce the velocity of the water entering and exiting the tank.

8. A method of using a multiple-tank water thermal storage system, the method comprising:
utilizing a multiple-tank water thermal storage system comprising:
at least two non-pressurized water tanks that are open to the atmosphere, each tank having a water-inlet diffuser and a water-outlet diffuser, each diffuser comprising a plurality of openings disposed within the tank and being configured to diffuse the water entering and exiting the tank through the diffuser to facilitate thermal stratification of the water in the tank, wherein said water-inlet diffuser and said water-outlet diffuser each include a water-inlet pipe, each water-inlet pipe comprises an adjustable control valve to control the flow of water through the diffuser, the water-inlet pipe of at least one of the water-inlet diffuser and the water-outlet diffuser of each tank comprises a flow meter, and wherein said tanks are fluidly connected in parallel with a water chiller and a heat exchanger, and wherein the water-inlet diffusers and water-outlet diffusers of each tank are fluidly connected to the water chiller and the heat exchanger;

a first pump in fluid communication with and positioned between the upper diffuser and the water chiller, the first pump configured to pump water from said tanks through the upper diffusers, through the water chiller, and back to said tanks through the lower diffusers;

a first block valve in fluid communication with and positioned between the water chiller and the lower diffusers;

a second pump in fluid communication with and positioned between the lower diffusers and the heat exchanger, the second pump configured to pump water from said tanks through the lower diffusers, through the heat exchanger, and back to said tanks through the upper diffusers; and a second block valve in fluid communication with and positioned between the heat exchanger and the upper diffusers;

wherein, when the system is in a first condition, the adjustable control valves are open and adjusted such that the first pump pumps water from both tanks simultaneously through the upper diffusers, through the water chiller, and back to said tanks through the lower diffusers, wherein the second pump is off, and the second block valve is closed; and wherein, when the system is in a second condition, the adjustable control valves are open and adjusted such that the second pump pumps water from both tanks simultaneously through the lower diffusers, through the heat exchanger, and back to said tanks through the upper diffusers, the first pump is off, and the first block valve is closed:

adjusting the adjustable control valves such that the water from said tanks is pumped simultaneously through one of said water chiller and said heat exchanger and back to said tanks;

measuring the water level of each tank;

comparing the measured water level with a standard water level of each tank; and if the water levels of the tanks show differences, modifying the water level in the tanks by one of:
turning up the adjustable control valve of the water-inlet diffuser and turning down the adjustable control valve of the water-outlet diffuser in the tank with a lower water level; and
turning down the adjustable control valve of the water-inlet diffuser and turning up the adjustable control valve of the water-outlet diffuser in the tank with a higher water level.

9. The method of claim 8, wherein the water level of each tank can be obtained by a level sensor disposed in the tank.

10. The method of claim 8, wherein each tank comprises a plurality of temperature sensors, and said temperature sensors are disposed at different levels within the tank, said method further comprising:
measuring water temperatures at different levels in each tank by said temperature sensors;
calculating a real time thermal storage percentage of each tank using the measured water temperatures;
utilizing the real time thermal storage percentage as a parameter to compare the progress of thermal energy charging or thermal energy releasing of each tank, wherein, when the thermal storage system is being charged with thermal energy, a higher thermal storage percentage means that the progress of thermal energy charging of the corresponding tank surpasses others, and wherein, when the thermal storage system is releasing thermal energy, a higher thermal storage percentage means that the progress of thermal energy charging of the corresponding tank falls behind others; and if the thermal storage percentages of the tanks show differences, modifying the flow of water by one of turning up the adjustable control valves of water-inlet and water-outlet diffusers of the tank with a laggard progress and turning down the adjustable control valves of water-inlet and water-outlet diffusers of the tank with a leading progress.

11. The method of claim 8 further comprising the step of adjusting one or more adjustable control valves to ensure the flow ratio of the tanks equals the volume ratio thereof.

12. The multiple-tank water thermal storage system of claim 8, wherein each diffuser is configured to reduce the velocity of the water entering and exiting the tank.

13. A water thermal storage system, comprising:
first and second non-pressurized water tanks that are open to the atmosphere, each tank comprising an upper diffuser and a lower diffuser, each diffuser comprising a plurality of openings disposed within the tank and being configured to diffuse water entering and exiting the tank through the diffuser such as to facilitate thermal stratification of the water in the tank, and an upper adjustable control valve and a lower adjustable control valve configured to control the flow of water through the upper and lower diffusers respectively;
a water chiller and a heat exchanger, wherein the first and second water tanks are fluidly connected in parallel to the water chiller and the heat exchanger, and wherein the upper and lower diffusers of each tank are fluidly connected to the water chiller and the heat exchanger;
a cool charging pump configured to pump water from the first and second water tanks through the upper diffusers, through the water chiller, and back to the first and second water tanks through the lower diffusers; and
a cool releasing pump configured to pump water from the first and second water tanks through the lower diffusers, through the heat exchanger, and back to the first and second water tanks through the upper diffusers;
wherein, when charging the cool water, the upper and lower adjustable control valves are open and adjusted such that the cool charging pump pumps water from the first and second water tanks simultaneously through the upper diffusers, through the water chiller, and back to the first and second water tanks through the lower diffusers; and
wherein, when releasing the cool water, the upper and lower adjustable control valves are open and adjusted such that the cool releasing pump pumps water from the first and second water tanks simultaneously through the lower diffusers, through the heat exchanger, and back to the first and second water tanks through the upper diffusers.

14. The water thermal storage system of claim 13, wherein the upper diffuser of the first water tank is fluidly connected to the upper diffuser of the second water tank, the lower diffuser of the first water tank is fluidly connected to the lower diffuser of the second water tank, and the upper and lower diffusers of the water tanks are fluidly connected in parallel to the water chiller and the heat exchanger.

15. The water thermal storage system of claim 13, wherein warm water from the upper portion of the first and second tanks is simultaneously pumped out of the tanks and through the upper diffusers to the water chiller where the temperature of the water is decreased, and wherein the colder water exiting the water chiller is pumped through the lower diffusers into the lower portion of the first and second tanks.

16. The water thermal storage system of claim 15, wherein cold water from the lower portion of the first and second tanks is simultaneously pumped out of the tanks and through the lower diffusers to the heat exchanger where the temperature of the water is increased, and wherein the warmer water exiting the heat exchanger is pumped through the upper diffusers into the upper portion of the first and second tanks.

17. The water thermal storage system of claim 13, wherein the water levels of the first and second tanks are maintained by adjusting one or more of the adjustable control valves.

18. The water thermal storage system of claim 13, wherein the thermal storage percentages of the first and second tanks are maintained by adjusting one or more of the adjustable control valves.

19. The water thermal storage system of claim 13, wherein the water at the top of the first water tank is maintained at substantially the same temperature as the water at the top of the second water tank.

20. The water thermal storage system of claim 13, wherein the water at the bottom of the first water tank is maintained at substantially the same temperature as the water at the bottom of the second water tank.

21. The multiple-tank water thermal storage system of claim 13, wherein each diffuser is configured to reduce the velocity of the water entering and exiting the tank.

* * * * *